(12) United States Patent
Sanders

(10) Patent No.: US 12,228,451 B2
(45) Date of Patent: Feb. 18, 2025

(54) SPECTROMETER WITH SELF-REFERENCED CALIBRATION

(71) Applicant: Wisconsin Alumni Research Foundation, Madison, WI (US)

(72) Inventor: Scott Sanders, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 237 days.

(21) Appl. No.: 17/885,042

(22) Filed: Aug. 10, 2022

(65) Prior Publication Data

US 2024/0053198 A1 Feb. 15, 2024

(51) Int. Cl.
*G01J 3/02* (2006.01)
*G01J 3/10* (2006.01)
*G01J 3/42* (2006.01)
*G01N 21/35* (2014.01)

(52) U.S. Cl.
CPC ........... *G01J 3/0297* (2013.01); *G01J 3/0208* (2013.01); *G01J 3/0224* (2013.01); *G01J 3/108* (2013.01); *G01J 3/42* (2013.01); *G01N 21/35* (2013.01); *G01N 2021/3595* (2013.01)

(58) Field of Classification Search
CPC ...... G01J 3/0297; G01J 3/0208; G01J 3/0224; G01J 3/108; G01J 3/42; G01N 21/35; G01N 2021/3595; G01N 21/0303; G01N 21/274; G01N 21/3563; G01N 21/552
See application file for complete search history.

(56) References Cited

U.S. PATENT DOCUMENTS 8,729,475 B1 * 5/2014 Wong ................. G01N 21/0303
250/343
2022/0120680 A1 4/2022 Lendl et al.

OTHER PUBLICATIONS

Stephan Freitag et al.; "Polarimetric Balanced Detection: Background-Free Mid-IR Evanescent Field Laser Spectroscopy for Low-Noise, Long-term Stable Chemical Sensing." ACS sensors 6, No. 1 (2020): pp. 35-42.

* cited by examiner

*Primary Examiner* — Courtney D Thomas
(74) *Attorney, Agent, or Firm* — Boyle Fredrickson, S.C.

(57) ABSTRACT

An absorption spectrometer with self-referencing calibration takes two measurements along a first and second path having different distances through a sample while largely preserving all other aspects of the optical path and system constant. Comparing these two measurements allows extraction of the spectrum largely free from instrument-specific artifacts.

14 Claims, 3 Drawing Sheets

SPECTROMETER WITH SELF-REFERENCED CALIBRATION

STATEMENT REGARDING FEDERALLY SPONSORED RESEARCH OR DEVELOPMENT

This invention was made with government support under W911NF-20-2-0181 awarded by the ARMY/ARO. The government has certain rights in the invention.

CROSS REFERENCE TO RELATED APPLICATION

Background of the Invention

The present invention relates to absorption spectroscopy and in particular to an absorption spectrometer that can be calibrated without the need to replace a material being sampled with a different calibration material.

Infrared (IR) absorption spectroscopy is a technique used to study and identify chemical substances in solid, liquid or gas. The technique is conducted with an infrared spectrometer which passes a beam of infrared light through a sample held in a sample cell and detects the absorption of different light frequencies by that sample to produce a spectrum providing absorption as a function of frequency. The shape of the spectrum provides a signature that can be used to characterize the sample.

The spectroscopy light source may be a tunable laser that can be varied between different frequencies allowing separate measurement of absorption at each frequency. Substantial benefits are obtained in an alternate approach termed Fourier-transform infrared spectroscopy (FTIR) where a broadband light source is modulated by an interferometer and the spectrum extracted by taking a Fourier transform of the light passing out of the sample cell.

In either case, the spectrometer is normally calibrated by making a separate measurement of a reference material, for example, with the sample cell containing air or a vacuum. This reference measurement captures the variations in light intensity from influences outside of the sample and is used to correct the resulting spectrum for these machine-specific errors.

Calibrating a spectrometer can be difficult when the spectrometer is used has a sensor in a control application, for example, when using a spectrometer to monitor fuel composition during operation of a combustion engine. Calibration in this situation requires either replacement of the fuel line with a sample cell or the introduction of a reference material into the fuel line itself (e.g., an air bubble) which raises the problems of contamination of the reference material and disruption of fuel flow.

SUMMARY OF THE INVENTION

The present invention provides a spectroscope providing self-referenced calibration in which the sample is not replaced by a different reference material, but instead the reference is effectively obtained by making measurements along two paths having different lengths through the sample. The paths desirably overlap over substantially their entire length except for a portion of the paths within the sample. This may be achieved in one embodiment through the use of a test cell employing evanescent waves extending into the sample from a reflecting surface. A shifting of the polarization of the light impinging on the reflecting surface changes the depth of the evanescent waves altering the effective path length through the sample without otherwise substantially changing the optical path.

More specifically, in one embodiment, the invention may provide an absorption spectrometer having a light detector and a light source providing a beam directed along a first and second path to be received by the light detector. A sample holder is positioned along the path and adapted to position a sample to absorb light from the beam along the first and second paths, the first and second paths having different path lengths through the sample. An electronic processor communicates with the light detector to make measurements of light intensity of light received along the first and second paths, respectively, after passage through the sample, and combines the separate measurements to provide an output indicating absorption of light by the sample isolated from variations in light intensity from influences outside of the sample. At least a portion of the first and second paths within the sample overlap.

It is thus a feature of at least one embodiment of the invention to implement a calibration process with as few as two measurements differing substantially only by their amount of travel through similar regions of the sample. By employing the sample itself for calibration, the mechanical difficulty of introducing a different reference material can be reduced or eliminated and by constraining the paths of light through the same or similar portions of the sample material, the effects of inhomogeneities in the sample material are minimized.

The first and second paths may also overlap outside of the sample.

It is thus a feature of at least one embodiment of the invention to leave the remainder of the optical system largely unchanged so that during the processing of the signal and the reference signal, all exogenous, spectrometer-specific effects may be canceled.

The first and second paths within the sample may be defined by evanescent light waves.

It is thus a feature of at least one embodiment of the invention to provide a change in path length by changing the depth of the evanescent waves without substantially changing the optical path before or after the evanescent wave.

The light source may include a polarizer changing the polarization of the beam to change a path length between the first and second paths.

It is thus a feature of at least one embodiment of the invention to take advantage of the effect of polarization on the depth of evanescent waves to change the path length without the need to move material into or out of the path such as would add mechanical complexity and the potential for additional error from changing attenuation caused by the introduced material.

The light source may be a laser having a 45° polarization and passing through a rotatable polarizer rotating between relative position of 0° and 90° with respect to the polarization to provide the first and second path lengths.

It is thus a feature of at least one embodiment of the invention to provide a symmetric polarization filter rotating about the light propagation direction to provide light of alternating polarization states.

The sample holder may provide attenuated total reflection at an interface to the sample, for example, using a multi-bounce ATR crystal having a reflective face adjacent to the sample.

It is thus a feature of at least one embodiment of the invention to provide a system that can be used with standard ATR accessories.

In one embodiment, the light source provides light having components with a first and second different polarization and the detector is a polarization-sensitive detector distinguishing between the light of the first and second different polarizations to provide the measurements of light along the first and second paths.

It is thus another feature of at least one embodiment of the invention to permit simultaneous measurements of the two path lengths.

The path lengths of the first and second paths may be in the ratio of at least 1:1.5.

It is thus a feature of at least one embodiment of the invention to provide a substantial change in path length distance between the first and second paths for improved calibration accuracy.

In one embodiment, the sample holder may be a conduit adapted to allow for a flow of liquid, such as a liquid fuel, therethrough, and the spectrometer may include an engine controller for adjusting at least one of timing and ignition power according to the output indicating absorption of light by the sample.

It is thus a feature of at least one embodiment of the invention to provide a robust spectrometer sensor suitable for applications such as engine control where interruption of the sensing process for calibration would be disadvantageous.

These particular objects and advantages may apply to only some embodiments falling within the claims and thus do not define the scope of the invention.

DETAILED DESCRIPTION OF THE PREFERRED EMBODIMENT

Figure 1:
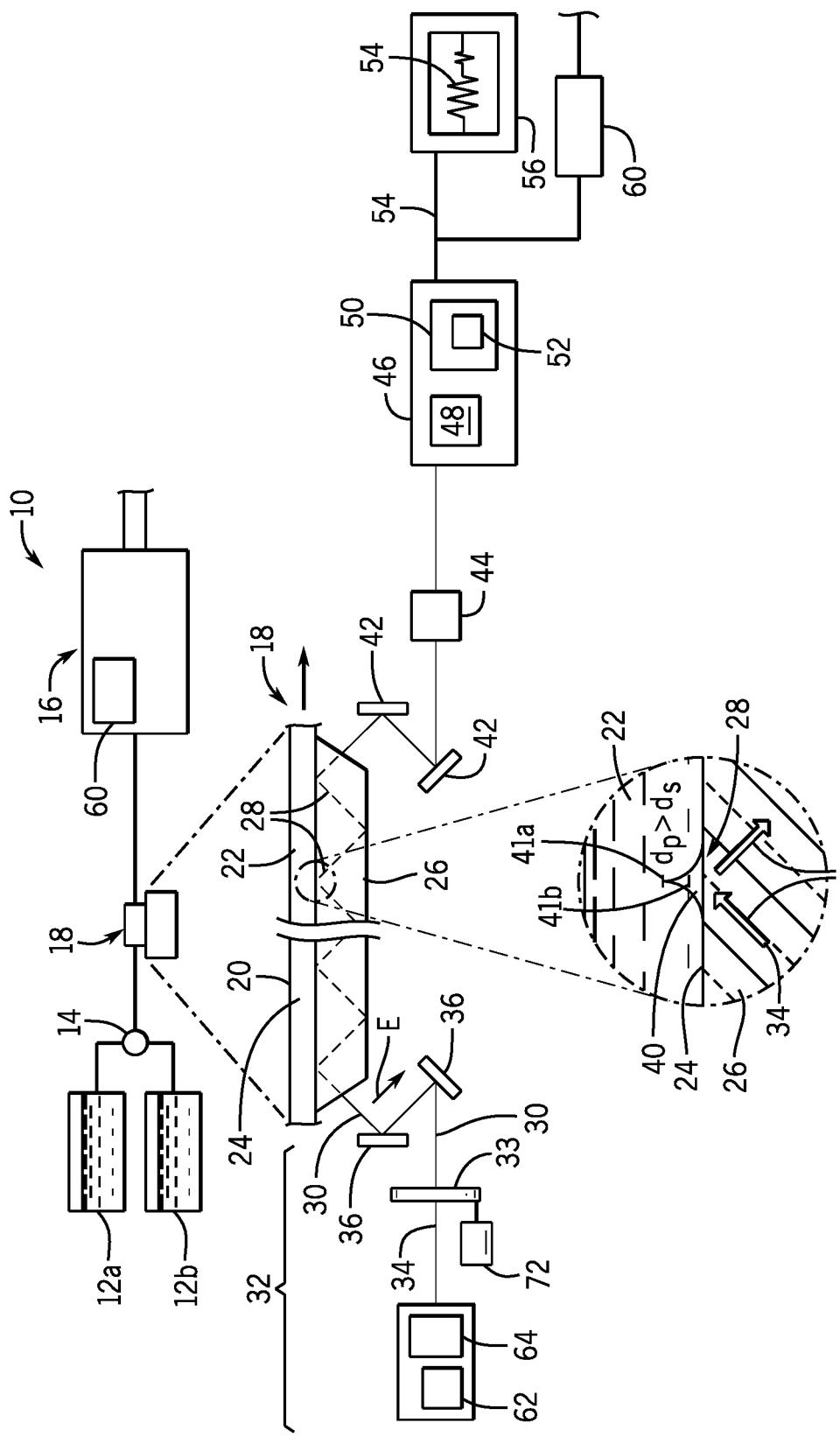
FIG. 1 is a block diagram of an engine controller illustrating one application of the current design and showing, in a first expanded, fragmentary view the principal components of the polarization-sensitive spectroscope, and in a second expanded view, evanescent waves extending beyond a reflective surface and providing a measuring of the sample.

Referring now to FIG. 1, an engine control system 10 employing spectrographic monitoring of fuel composition may provide a first and second fuel source 12a and 12b, for example, having different cetane numbers (CN) and producing a variable mix of fuel via valve 14 to a combustion engine 16. The variable mix of fuel may alternatively represent a single fuel source receiving fuels of various compositions at different times, for example, as might be experienced by an engine during actual use and subject to imperfect fuel supplies or a multifuel engine intended for operation on different fuels at different times.

As noted, the fuel is delivered to a combustion engine 16, for example, through a conventional carburetor or fuel injection system. Prior to the engine 16 receiving the fuel, the fuel passes through an analyzer 18 providing an indication of fuel quality (for example, Cetane number (CN)) which may be used to control the engine 16 as will be discussed.

Referring still to FIG. 1, the analyzer 18 may provide for a fuel line 20 through which fuel may flow as a sample 22. One wall of the fuel line 20 is formed by a transparent interface provided by a reflecting surface 24 of an attenuated total reflection (ATR) crystal 26. In one example, the crystal 26 may be a zinc selenide (ZnSe) ATR crystal, providing sixteen bounce locations 28 on the reflecting interface 24. Generally, the bounce locations 28 will be points of total reflection of a zigzagging light path 30 through the ATR crystal 26 as will be discussed in more detail below. The zinc selenide material of the ATR crystal 26 is selected to provide a transparent light conduit that is substantially non-polarizing.

The analyzer 18 may also include a light source 32 providing an infrared beam of light 34 that may travel along the light path 30, passing first through a rotatable polarizer 33 and then, as conducted by guidance mirrors 36, through a first face of the ATR crystal 26. Within the ATR crystal 26, the light path periodically strikes each bounce location 28 producing evanescent waves 40 that travel into the sample 22. Absorption of energy of the evanescent waves 40 by the sample 22 is said to attenuate the total reflection at the bounce locations 28 and, by means of this attenuation, provides a measure of absorption of the light by the sample 22.

Light exiting a second face of the ATR crystal 26 is collected by a second set of guidance mirrors 42 and directed toward a broadband light detector 44. The detector 44 provides an electrical signal corresponding to intensity to an analyzing computer 46.

The electronic computer 46 may, for example, have one or more processors 48 communicating with the computer memory 50 holding a stored program 52 as will be described below. Generally, operation of the computer 46 will be such as to convert the electrical signal from the detector 44 into a spectrum 54 which may be displayed on a graphic terminal 56 or the like or provided to an engine controller 60 in use to identify fuel composition for control of engine timing, spark or glow plug (igniter) energy or the like. This control, for example, may be by means of a lookup table mapping fuel composition to particular values of engine timing or igniter energy.

Referring still to FIG. 1, the light source 32 may in one embodiment provide a broadband infrared emitter 62 providing infrared light to an interferometer 64 that may induce interference between the received light and a phase delayed reflection of the light at various phase offsets to modulate each frequency of the light at a unique rate. A signal from the light source 32 (not shown) may be provided to the computer 46 indicating changing phase of the interferometer as a modulation reference. The computer 46 executing the program 52 may decode the signal produced by the detector 44 receiving this modulated light, for example, by applying a Fourier transform to this signal, generating a spectrum. As such, the analyzer 18 may implement a Fourier transform infrared spectrometer (FTIR).

In an alternative embodiment, the light source may include a narrowband frequency-modulated laser source such as a quantum cascade laser sweeping through frequencies to produce a spectrogram demodulated by time.

Figure 2:
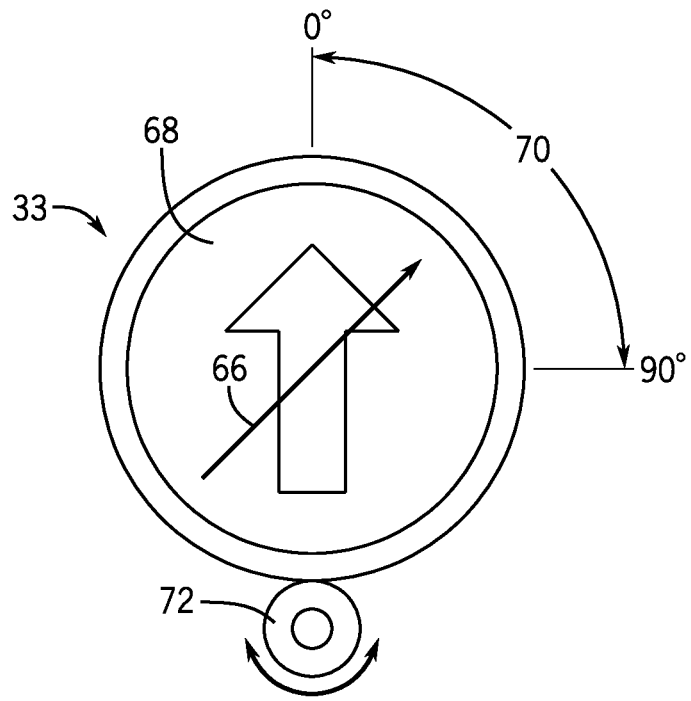
FIG. 2 is a view of a polarizer of FIG. 1 taken along the optical path through the polarizer showing rotation of the polarizer to change the polarization of the light producing the evanescent waves.

Referring to FIGS. 1 and 2, the polarizer 33 of the light source 32 may be mounted to rotate about an axis parallel to the propagation of the beam of light 34. In this regard, the polarizer 33 preferentially receives the beam of light 34 having a 45 degree polarization angle 66 and may have a polarizing filter 68 rotatable, as indicated by arrow 70, between a 0° position and a 90° position, effectively providing an exit beam from the polarizer 33 having either a 0° polarization (termed a p-orientation) or a 90° polarization (termed an s-orientation) selectable by rotation of the polarizer 33 by an actuator 72, for example, controlled by a stepper motor or the like communicating with the computer 46.

Referring now again to FIG. 1, the depth of the evanescent wave 40 into the sample 22 (generally perpendicular to the reflecting interface 24) will be dependent on the polarization of the light from the polarizer 33 with a first depth 41a of the evanescent wave 40 being greater for the p-orientation than a second depth 41b for the s-orientation. The signal obtained with the p-orientation, for example, may have a depth of the evanescent waves 40 of about 6 μm whereas the s-orientation depth may be about 3 μm. The exact difference depends on the angle of reflection and the refractive index of the ATR crystal 26. The signal detected by the detector 44 using the p-orientation will henceforth be termed the reference, and the corresponding signal using the s-orientation signal will simply be termed the signal.

Generally, the signal for each frequency component will have the form of:

$$T_s = I_{out}/I_{in} = Ae^{-\mu d}$$

where $T_s$ is the signal measurement for each given frequency, being a ratio of the output intensity to the input intensity at the given frequency ($I_{out}/I_{in}$), A is some unknown attenuation caused by the optical path outside of the sample, μ is the attenuation constant of the sample for that frequency, and d is the path length through the sample. This formula generally recites the Bouguer-Lambert law.

Similarly, the reference will have the form of:

$$T_r = I_{out}/I_{in} = Ae^{-\mu(2d)}$$

where 2d reflects the two times increase in path length through the sample using the S-orientation but could be any arbitrary scaling of d based on the actual path length change obtained.

Calibration of the spectrum may then be simply effected by dividing the sample signal by the reference signal on a frequency point-by-point basis yielding:

$$T_s/T_r = Ae^{-\mu d}/Ae^{-\mu(2d)} = e^{-\mu(d-2d)}$$

or $$\mu = \log(T_s/T_r)C$$

where C a scaling constant determined by the difference in path length and generally unchanging for a given analyzer 18. Importantly, the instrument attenuation A cancels in this operation thus providing a calibrated signal that is largely indifferent to the attenuation affects outside of the sample 22 other than exogenous effects such as dirt having a polarizing property. These latter influences can be readily controlled by excluding any source of crystalline dust or the like that might have polarization properties from the optical path 30.

Figure 3:
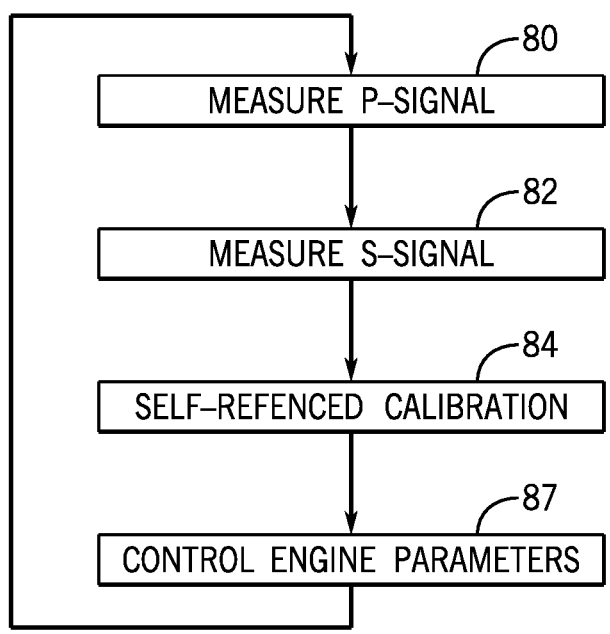
FIG. 3 is a flowchart of the steps of a control program of the spectrometer applied to engine control.

Referring now to FIG. 3, during use of the apparatus described above, the program 52 executed by the electronic computer 46 may control the various components per process block 80 to make a first spectral measurement across all frequencies with the polarizer 33 in a p-orientation. Next, at process block 82, the polarizer 33 may be moved to make the same measurement with an s-orientation, desirably this second measurement occurring at a rate that is much faster than the flow rate or change of the sample 22.

At process block 84 the sample is divided by the reference value on a frequency point-by-point basis to output a spectrum 54 which may be displayed or analyzed to deduce material properties. Where the sample 22 is a fuel, the material properties may be used to control an engine per process block 86.

Figure 4:
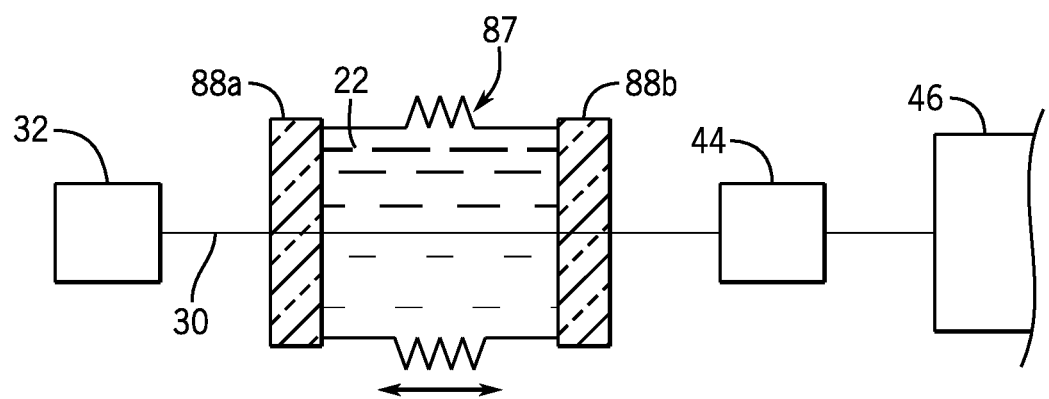
FIG. 4 is a simplified representation of an alternative embodiment for providing self-referenced calibration of a spectrometer per the present invention.

Referring now to FIG. 4, the general principle of self-reference calibration described above can be realized in a variety of systems that can provide measurements along two different path lengths through the sample 22 along the light path 30. In one alternative embodiment, the sample 22 may be held within a cell 87 that is expandable, for example, with a bellows along light path 30 and which provides an inlet window 88a and opposed element 88b also providing a window and positioned across the direction of expansion. Again two measurements are made to generate a signal and the reference as discussed above, with the bellows in the first and second configuration providing different distances of travel of the light through the sample 22 to provide this self calibration. Again instrument affects outside of the sample 22 are canceled and variations in the sample 22 minimized by using the same sample path. A variation on this approach makes the opposed element 88b a mirror and places the detector 44 and light source 32 on the same side of the cell 87. The changing path length is thus the round-trip distance from the inlet window 88a to the opposed element 88b and back to the inlet window 88a.

Figure 5:
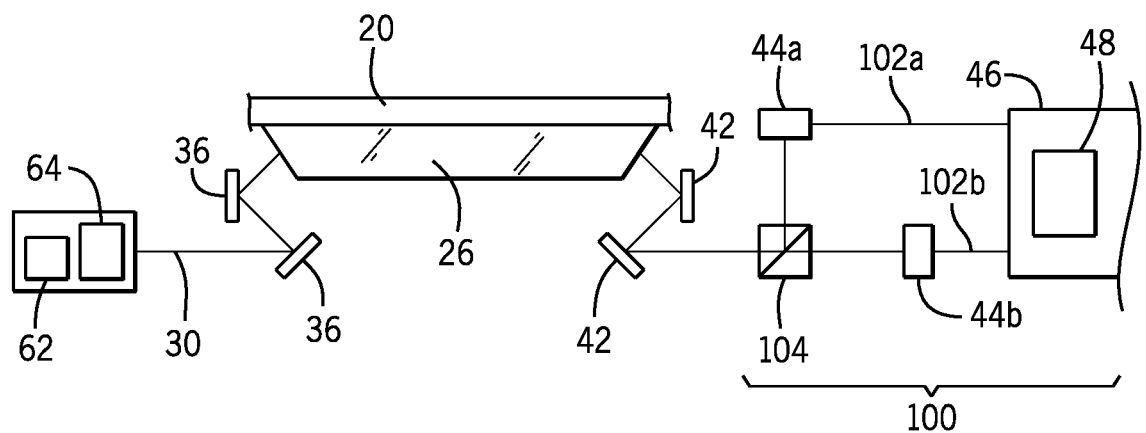
FIG. 5 is a figure similar to FIG. 1 showing an alternative embodiment for implementing the polarization-sensitive spectroscope using downstream polarization.

Referring now to FIG. 5, in an alternative embodiment the polarizer 33 upstream from the ATR crystal 26 may be removed in favor of a polarization-sensitive detector 100 downstream from the ATR crystal 26 and providing a first and second signal 102a and 102b independently measuring light in the s-orientation and p-orientation. In this case, the light source 32 provides both polarization components, for example, using a 45° polarization angle as described above. In one embodiment, the polarization-sensitive detector 100 may make use of a polarizing beam splitter 104 diverting separate beams to detectors 44a and 44b which then provide the measurements of process blocks 80 and 82 described above. Alternatively, the polarization sensitive detector 100, may employ other mechanisms including, for example, a rotatable polarizer.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom" and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" or "a computer" should be understood to include one or more similar devices that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claimed is:

1. An absorption spectrometer comprising:
a light detector and a light source providing a beam directed along a path;
a sample holder providing a chamber adapted to hold a sample in the path through which the beam may pass, the sample holder movable to change the length of the path through the sample between a first and second length;
an electronic processor communicating with the light detector to make measurements of light intensity of light along the path at the first and second length to provide an output indicating absorption of light by the sample isolated from variations in light from influences outside of the sample; and
wherein the chamber provides an entrance window accepting the beam from the light source into the sample and an exit window discharging the beam from the sample to the light detector, wherein the sample holder moves the entrance window with respect to the exit window to change a distance therebetween.

2. The absorption spectrometer of claim 1 wherein the chamber changes its dimension along the path to change the path length.

3. The absorption spectrometer of claim 1 wherein walls of the chamber deform to change the path length through the sample.

4. The absorption spectrometer of claim 1 wherein the path is a straight line between the light source and light detector.

5. The absorption spectrometer of claim 1 wherein the beam at the first length and second length follows a common path between the light detector and light source.

6. The absorption spectrometer of claim 1 wherein the beam has a polarization that is unchanged between measurements of the beam along the first length and second length.

7. The absorption spectrometer of claim 1 wherein the electronic processor combines the measurements along the first length and second length by dividing one measurement by the other.

8. The absorption spectrometer of claim 1 wherein the first and second lengths stand in a ratio of at least 1:1.5.

9. The absorption spectrometer of claim 1 wherein the chamber is a conduit adapted to allow for a continuous unidirectional flow of liquid therethrough.

10. The absorption spectrometer of claim 9 further including a liquid sample.

11. The absorption spectrometer of claim 10 wherein the liquid sample is a liquid fuel.

12. An absorption spectrometer comprising:
a light detector and a light source providing a beam directed along a path;
a sample holder providing a chamber adapted to hold a sample in the path through which the beam may pass, the sample holder movable to change the length of the path through the sample between a first and second length;
an electronic processor communicating with the light detector to make measurements of light intensity of light along the path at the first and second length to provide an output indicating absorption of light by the sample isolated from variations in light from influences outside of the sample;
wherein the chamber is a conduit adapted to allow for a continuous unidirectional flow of liquid therethrough;
further including a liquid sample wherein the liquid sample is a liquid fuel; and
further including an engine controller for adjusting at least one of timing and igniter power according to the output indicating absorption of light by the sample.

13. The absorption spectrometer of claim 1 wherein the absorption spectrometer is an FTIR spectroscope and wherein the electronic computer applies a Fourier transform to a received signal to extract a spectrum.

14. The absorption spectrometer of claim 1 wherein a changing in separation between the entrance window and exit window define the first and second paths.

* * * * *